United States Patent
De Smet et al.

(10) Patent No.: US 10,303,558 B2
(45) Date of Patent: May 28, 2019

(54) CHECKPOINTING HIGHER ORDER QUERY OPERATORS

(71) Applicant: Microsoft Technology Licensing, LLC, Redmond, WA (US)

(72) Inventors: Bart De Smet, Bellevue, WA (US); Tihomir T. Tarnavski, Sammamish, WA (US); Eric Rozell, Newcastle, WA (US); Alex Clemmer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/690,353

(22) Filed: Apr. 17, 2015

(65) Prior Publication Data

US 2016/0306714 A1    Oct. 20, 2016

(51) Int. Cl.
*G06F 11/00* (2006.01)
*G06F 11/14* (2006.01)

(52) U.S. Cl.
CPC ...... *G06F 11/1469* (2013.01); *G06F 11/1407* (2013.01); *G06F 11/1451* (2013.01); *G06F 2201/84* (2013.01)

(58) Field of Classification Search
CPC ............ G06F 11/1469; G06F 11/1451; G06F 2201/84
USPC .......................................................... 714/20
See application file for complete search history.

(56) References Cited

U.S. PATENT DOCUMENTS

| | | | | |
|---|---|---|---|---|
| 6,112,304 | A * | 8/2000 | Clawson | G06F 9/4875 709/202 |
| 6,327,587 | B1 * | 12/2001 | Forster | G06F 17/30457 |
| 6,584,581 | B1 | 6/2003 | Bay et al. | |
| 6,907,546 | B1 * | 6/2005 | Haswell | G06F 11/3684 714/38.11 |
| 7,290,056 | B1 * | 10/2007 | McLaughlin, Jr. | H04L 43/0852 709/201 |
| 7,716,215 | B2 | 5/2010 | Lohman et al. | |
| 7,886,180 | B2 * | 2/2011 | Jin | G06Q 40/04 709/223 |
| 8,572,051 | B1 | 10/2013 | Chen et al. | |
| 8,726,076 | B2 | 5/2014 | Goldstein et al. | |
| 9,183,255 | B1 * | 11/2015 | Brown | G06F 17/30463 |
| 2002/0174379 | A1 * | 11/2002 | Korenevsky | G06F 17/30289 714/19 |
| 2008/0295111 | A1 * | 11/2008 | Craft | G06F 11/1407 719/313 |
| 2009/0031310 | A1 * | 1/2009 | Lev | G06F 11/1405 718/101 |

(Continued)

OTHER PUBLICATIONS

Wikipedia definition for "nesting", retrieved from https://en.wikipedia.org/wiki/Nesting_(computing) (Year: 2018).*

(Continued)

*Primary Examiner* — Yair Leibovich

(57) ABSTRACT

Higher-order operators are subject to checkpointing as well as recovery. The state of a higher-order operator, comprising an outer subscription and one or more inner subscriptions, is captured and subsequently utilized to recover the operator. In one instance, a data representation of code that can produce an inner subscription is saved. In other instance, an outer subscription is decoupled from inner subscriptions of a higher-order operator.

18 Claims, 12 Drawing Sheets

(56) References Cited

U.S. PATENT DOCUMENTS

| | | | |
|---|---|---|---|
| 2009/0037550 A1* | 2/2009 | Mishra | G06F 9/485 709/208 |
| 2009/0171733 A1* | 7/2009 | Bobak | G06Q 10/06 705/80 |
| 2012/0072411 A1 | 3/2012 | De Smet et al. | |
| 2016/0125041 A1* | 5/2016 | Smith | G06F 17/30548 707/770 |
| 2016/0299799 A1* | 10/2016 | De Smet | G06F 17/30448 |

OTHER PUBLICATIONS

Unknown, "Reactive Extensions v2.0 Release Candidate available now!", Jun. 20, 2012, 45 pages http://blogs.msdn.com/b/rxteam/archive/2012/06/17/reactive-extensions-v2-0-release-candidate-available-now.aspx.

Meek, Colin, "Streaminsight Checkpoints: What, How, and Why?", Apr., 9, 2012, 3 pages. http://blogs.msdn.com/b/meek/archive/2012/04/09/streaminsight-checkpoints-what-how-and-why.aspx.

Krishnaswami et al., "Higher-Order Functional Reactive Programming in Bounded Space", In Proceedings of the 39th ACM SIGPLAN-SIGACT Symposium on Principles of Programming Languages, Jan. 25, 2012, 14 pages, ACM. http://research.microsoft.com/en-us/um/people/nick/frpbounded.pdf.

Smith et al., "Fault-Tolerance in Distributed Query Processing", Feb. 2005, 19 pages. http://www.cs.ncl.ac.uk/research/pubs/trs/papers/893.pdf.

Vu et al., "Complexity of Higher-Order Queries", In Proceedings of the 14th International Conference on Database Theory, Mar. 21, 2011, 12 pages, ACM. http://icdt.tu-dortmund.de/proceedings/edbticdt2011proc/WebProceedings/papers/icdt/a20-vu.pdf.

Chandramouli et al., "Query Suspend and Resume", In Proceedings of the ACM SIGMOD International Conference on Management of Data, Jun. 6, 2007, 12 pages, ACM.

Vu, Huy, "Higher-Order Queries and Applications", In Thesis of Doctor of Philosophy, Retrieved Apr. 17, 2015, 179 pages. http://www.cs.ox.ac.uk/people/huy.vu/PhDThesis.pdf.

Unknown, "Reactive Extensions (RX)," Retrieved Apr. 17, 2015, 2 pages. http://msdn.microsoft.com/en-in/data/gg577609.aspx.

Markl et al., "Robust Query Processing through Progressive Optimization", In Proceedings of the ACM SIGMOD International Conference on Management of Data, Jun. 13, 2004, 12 pages, ACM. http://www.cse.iitb.ac.in/~dbms/Data/Courses/CS632/2009/Papers/sigmod04-markl.pdf.

Gulwani, et al., "Platform Independent Checkpointing of a C-Program in Execution", Retrieved from <<http://research.microsoft.com/en-us/um/people/sumitg/pubs/checkpointing.ps>>, Feb. 1, 2001, 15 Pages.

Murray, et al., "Naiad: A Timely Dataflow System", In Proceedings of the 24th ACM Symposium on Operating Systems Principles, Jan. 1, 2013, pp. 439-455.

"International Search Report and Written Opinion Issued in PCT Application No. PCT/US2016/027171", dated Jul. 5, 2016, 10 Pages.

"Second Written Opinion Issued in PCT Application No. PCT/US2016/027171", dated Mar. 24, 2017, 9 Pages.

"International Preliminary Report on Patentability Issued in PCT Application No. PCT/US2016/027171", dated Jul. 27, 2017, 11 Pages.

* cited by examiner

CHECKPOINTING HIGHER ORDER QUERY OPERATORS

BACKGROUND

Reliability of data processing systems can be impacted by interruptions in computational service. Checkpointing is a technique that introduces fault tolerance to data processing systems by enabling recovery after a failure occurs. Generally, checkpointing involves acquiring and saving a snapshot of the internal state of a system periodically or at critical times. In the event of a system failure, the state of the system can be restored to the saved state. The restored system can subsequently continue to operate from the point in time that the state was last saved.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to checkpoint and recovery for higher-order query operators. Higher-order query operators are different from conventional single-order operators in that higher-order query operators generally deal with one or more sequences of one or more sequences. Checkpointing involves capturing and saving state of a higher-order operator including one or more outer subscriptions as well as one or more inner subscriptions. In accordance with one aspect, a data representation that describes how to create an inner subscription in terms of executable code is generated and available for checkpointing. The state of the inner subscription can also be captured. In accordance with another aspect, outer subscriptions can be decoupled from inner subscriptions and sequences produced thereby, for example by way of a bridge or other mechanism.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
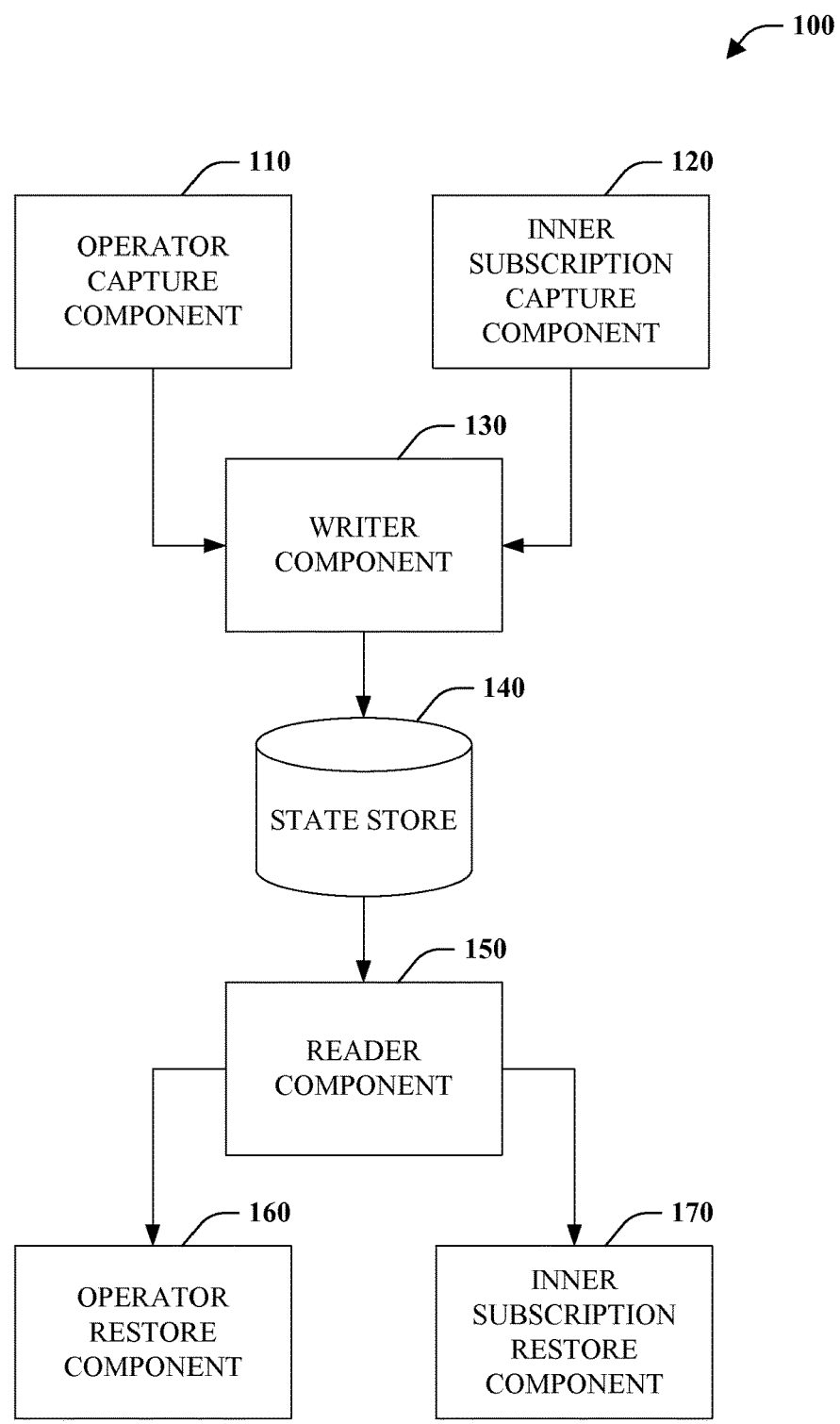
FIG. 1 is a block diagram of a checkpoint recovery system associated with a high-order operator.

Data processing systems including event processing and database systems are typically single order. That is to say, they have a concept of data sources that can contain elements, but these elements cannot be data sources themselves. For example, a relational database cannot include a table of tables. Specifically, rows and columns of a table cannot hold another table.

Higher-order systems provide a lot of flexibility and allow for great levels of expressiveness. An example in the context of event processing is a grouping operation that partitions a stream of stock tick events into a stream of streams grouped by company symbol. Each inner stream corresponds to one company, while the outer stream produces the next company's stream upon receiving the company's first stock tick event:

```
IObservable<Tick> stocks = ...;
IObservable<IGroupedObservable<string, Tick>> stocksBySymbol
    = stocks.GroupBy(s => s.Symbol);
```

Yet another example, is switching over a sequence of sequences to observe the elements in the latest received inner sequence. This effectively allows one to switch from one sequence to another upon receiving a new sequence:

```
IObservable<IObservable<T>> xss = ...;
IObservable<T> latestXs = xss.Switch( );
```

One complexity of higher-order systems is building state persistence logic, generally referred to as checkpointing, required to support reliable stateful computation in the face of system crashes and recoveries, for example. Details below generally pertain to checkpoint and recover support for higher-order operators in a data processing system. First, higher-order operators are defined. Next, the state required to be saved for higher-order operators to enable recovery is discussed.

An operator, sometimes called a query operator, is a unit of processing over data. For example, an operator can provide operations such as filtering, projection, aggregation, or sorting of data. Further, operators are combinable with other operators and data is passed, or, in other words, flows, between operators such that the output of one operator is the input to another operator. In general, an operator that involves one or more sequences of one or more sequences is considered higher order.

However, a higher-order instance of an operator can be constructed that is first order in nature because of generic parameter instantiation. Consider the "Take" operator below:

IObservable<T> Take<T>(IObservable<T> xs, int count);

If "IObservable<int>" is substituted for "T," the operator deals with a higher-order sequence as its input namely "IObservable<IObservable<int>>." Herein, such operators are not considered higher order since all operators could then be deemed higher order. Nevertheless, the ability to close a generic operator over another sequence is a noteworthy detail.

Instead, operators that intentionally, in their most generic form, deal with a sequence of sequences (e.g., outer sequence with one or more inner sequences) or sequences of sequences are considered higher order. One example is a "Switch" operator shown below.

IObservable<T> Switch<T>(IObservable<IObservable<T>> xss);

This operator always consumes a sequence of sequences regardless of the instantiation of the type parameter "T." Similarly, operators such as "GroupBy" and "Window" deal with higher-order sequences on their output side:

```
IObservable<IObservable<T>> Window<T>(IObservable<T> xs, int count);
IObservable<IObservable<T>> Window<T>(IObservable<T> xs, TimeSpan duration);
...
IObservable<IGroupedObservable<T>> GroupBy<T, K>(IObservable<T> xs,
                                    Func<T, K> keySelector);
```

Generally, operators that give birth to, or, in other words, create, sequences at runtime are treated and considered as higher order. An example of a different operator that creates sequences is "SelectMany:"

```
IObservable<R> SelectMany<T, R>(IObservable<T> xs,
                                    Func<T, IObservable<R>> selector);
```

For each element "T" received on the source, the selector is invoked to obtain an inner sequence. Each such inner sequence is subscribed to by "SelectMany" in order to merge all of the inner sequence's elements into one flat sequence. This is an explicit flattening operator that is often implied in first-order systems such as relational database systems (where constructs like "GroupBy" require flattening of the obtained groups into flat row-based records). Herein, however, the "SelectMany" operator is considered higher order since it generates an inner sequence despite later flattening all inner sequence elements.

In an event processing systems, higher order operators can be built in a straightforward manner. As an example, consider a simplified "SelectMany" implementation:

```
IObservable<R> SelectMany<T, R>(IObservable<T> xs,
                                    Func<T, IObservable<R>> selector)
{
    return Create<R>(observer =>
    {
        var d = new CompositeDisposable( );
        d.Add(xs.Subscribe(x =>
        {
            d.Add(selector(x).Subscribe(y =>
            {
                observer.OnNext(y);
            });
        }));
        return d;
    });
}
```

For clarity and simplicity, handling of "OnError" and "OnComplete" records, synchronization of outgoing observer calls, exception handling, and removal of disposable resources upon termination of inner subscriptions have been omitted. The main point is when writing imperative code, a function returning an observable sequence is as trivial as a function returning some other object. Therefore, the implementation of the inner subscription is quite trivial: simply invoke the selector function and subscribe to the observable sequence it returns.

However, when considering checkpointing, things get quite a bit more complicated. A determination has to be made regarding what state needs to be persisted in order to allow a computation to restart. For example, if an outer sequence has already produced values "1, 2, 3," there would have been three invocations of the selector function leading to creation of three inner subscriptions. When saving the state of the whole "SelectMany" computation, the state of the inner subscriptions also needs to be saved. Not only that, upon restart the inner subscriptions need to be able to be reestablished such that their data flow is connected with the outgoing observer for a subscription to the "SelectMany" operator. Even though a "SelectMany" operator can flatten, or reduce, multiple sequences to a single sequence, since the operator is acquiring more sequences to flatten over time, if a failure occurs prior to such flattening, these inner sequences need to be saved to enable recovery.

One way to deal with this is to store all values received from inner child subscriptions to the outer parent or source sequence, so that the selector function can be re-invoked for each value upon recovery. While this would work in this particular case, it assumes that the selector function is a pure function, which for any given input will return the same for regardless of when it is invoked or what the execution environment may be. This is not necessarily true.

Other higher-order operators pose different challenges. Consider for example a simplified implementation of a "Switch" operator omitting some complexities for clarity:

```
IObservable<T> Switch<T>(IObservable<IObservable<T>> xss)
{
    return Create<T>(observer =>
    {
        var d = new CompositeDisposable( );
        var l = new SerialDisposable( );
        d.Add(l);
        d.Add(xss.Subscribe(xs =>
        {
            l.Disposable = xs.Subscribe(observer);
        }));
        return d;
    });
}
```

Here, the inputs are not able to be stored. The inner observable sequences are provided, but there is no value "x" that can be saved in order to re-obtain these inner sequences during recovery. In fact, even for "SelectMany" this can be problematic given that the type parameter "T" could be closed by using "IObservable<int>," so the values received in "xs" would be observable sequences.

To describe the complexity involved a bit more, consider the following example:

```
xs.Select(x => new { x, ys = Range(0, x) })
  .Where(t => t.x > 0)
  .Select(t => t.ys)
  .Switch( )
```

Here, the "Select" operator is responsible for introduction of a higher-order sequences in that its output is an "IObservable<AnonymousType>," where "AnonymousType" includes a property "y" that is of type "IObservable<int>." Next, the "Where" operator acts as a carrier of these anonymous type instances that contain an observable sequence. Finally, these inner sequences are projected out by another "Select" operator, whose result type happens to be "IObservable<IObservable<int>>."

Now the "Switch" operator has to support checkpointing such that upon recovery the connection to the current inner sequence is re-established. If a replay-based mechanism is considered, it relies on all operators to be parameterized by pure functions. In addition, lifetime management becomes an issue. For example:

```
xs.Select(x => new { x, ys = Range(0, x) })
  .Where(t => t.x > 0)
  .Select(t => t.ys)
  .Take(1)
  .Switch( )
```

Insertion of the "Take(1)" operator indicates a desire to prune out the source to tree (which could hold a lot of irrelevant state) as soon as an element is received. However, to recover the computation using a replay mechanism, the "Take" operator, which has no higher-order behavior, would have to be made replayable or the state of the entire chain kept alive so that reply of "xs" can be performed far back in time. It is clear that these mechanisms do not scale well. Either the state cannot be saved properly (in cases where a generic parameter is substituted for an observable sequence, making an operator higher order "by accident") or replay mechanisms have to be added in all sorts of places. Not to mention, assumptions of function purity are made.

As is described further below, one alternate approach relies on the ability of higher-order operators to save subscriptions to their inner sequences. As a result, operators need only save as part of their state handles (e.g., URI, identifier, reference) to inner subscriptions they have established.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a checkpoint recovery system 100 associated with a higher-order operator is illustrated. After initiation of a checkpoint operation, current runtime state associated with the operator is captured. Operator capture component 110 is configured to capture computation state of the higher-order operation. For example, such state can identify data elements already processed and one or more subscriptions. Unlike a single order operator, a higher-order operator relates to one or more sequences of one or more sequences and thus can produce to at least one inner sequence at runtime. Accordingly, capturing solely computational state associated with an outer sequence is not sufficient to enable recovery. Topology state can also be captured by the operator capture component 110 that identifies related or dependent inner subscriptions. Also needed is state associated with one or more inner sequences. The inner subscription capture component 120 is configured to capture state associated with a subscription to an inner sequence. Such state can correspond to a description of the subscription, for example in the form of data that describes code that creates the subscription, as well as the computational state related thereto. Writer component 130 is configured to receive, retrieve, or otherwise obtain or acquire state from the operator capture component 110 and the inner subscription capture component 120 and writes the state to state store 140. For instance, the writer component 130 can serialize state and add it to a store. State store 140 can be embodied as a non-volatile storage medium but may also be volatile if on a different machine, for example. Reader component 150 is configured to receive, retrieve, or otherwise obtain or acquire state data from the state store 140. For example, the corresponding state can be identified and deserialized by the reader component 150. Operator restore component 160 and inner subscription restore component 170 can obtain or acquire relevant state from the reader component 150. The operator restore component 160 is configured to restore at least computational state associated with one outer subscription and topology state identifying one of more subscriptions from the state. The inner subscription restore component 170 is configured to restore one or more inner subscriptions based on the state.

Figure 2:
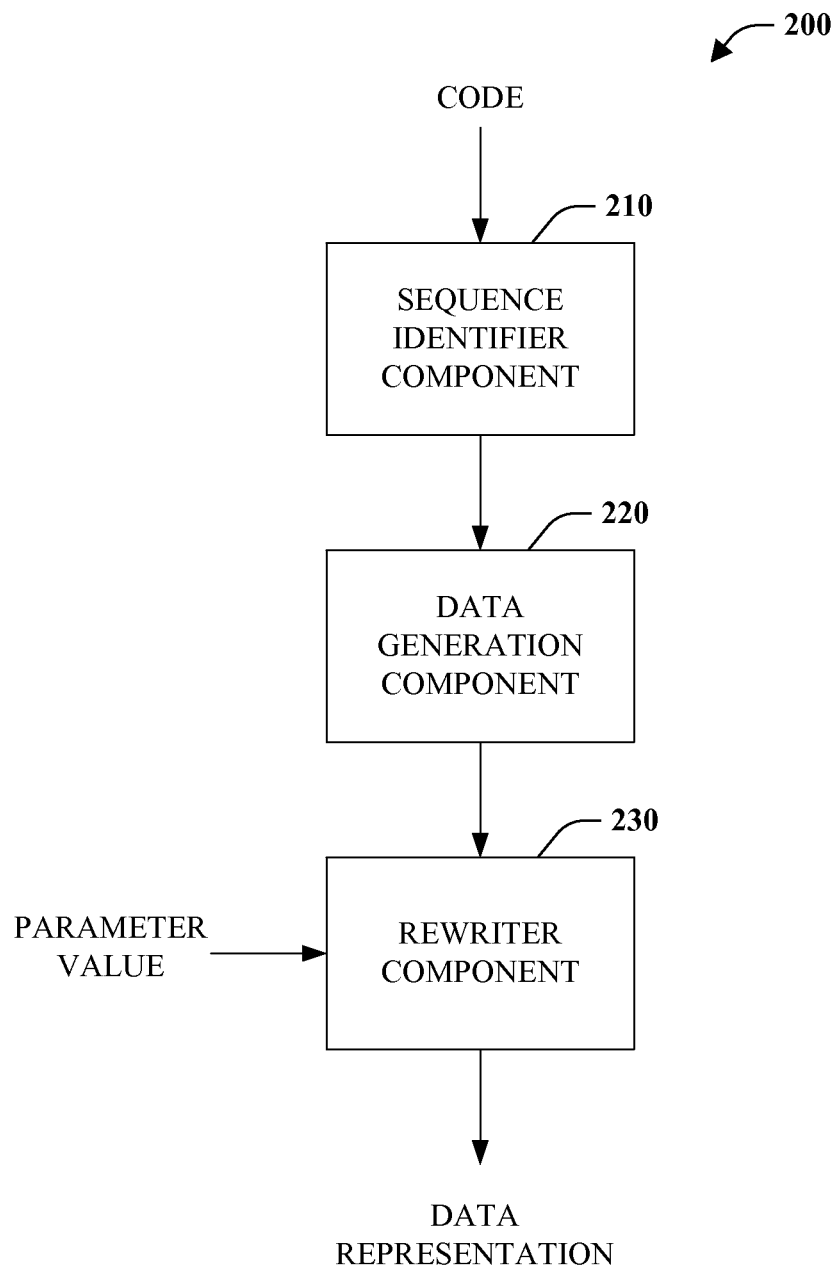
FIG. 2 is a block diagram of an inner subscription state generation system.

FIG. 2 depicts inner subscription state generation system 200 in accordance with one particular embodiment. Sequence identifier component 210 is configured to receive, retrieve, or otherwise obtain or acquire programming language code specifying one or more operators over data. Further, the sequence identifier component 210 is configured to statically analyze the code prior to execution and identify portions of code or expressions that produce sequences. In an alternate embodiment, the sequence identifier component 210 can be optimized to identify solely portions of code that are used in the context of a higher-order operation. Stated differently, the sequence identifier component 210 can be configured to identify places where higher-order sequences are introduced.

Data generation component 220 is configured to generate a data representation of code identified by the sequence identifier component 210. The data representation of code provides a description or blueprint of how to generate code that produces a sequence such as an inner sequence. In other words, code that is used to produce inner sequences, which corresponds to an inner subscription, is preserved and represented as data, for example in the form of an expression tree. Further, code can be provided originally as an expression tree and the data generation component 220 can capture a portion of the expression tree as a smaller expression tree as identified by the sequence identifier component 210. It is significant to capture a portion of the expression tree since in accordance with implementation the expression tree can be lost after a compilation step. Data generation component 220 provides a mechanism to capture a portion of the tree prior to it being lost. Further, by capturing the inner subscription as data, inner subscription is able to be persisted as state and is essentially promoted to a first-class program entity that can be saved and passed around like other first class entities such as strings and integers.

Rewriter component 230 is configured to rewrite the data representation to include the value of a parameter. A data representation of code can include one or more parameters or values it takes to execute. The data representation produced by the data generation component 220 can be rewritten by rewriter component 230 to include values of these parameters. In one instance, these parameters can be free variables, which are nonlocal variables not defined in the local scope. In this case, the rewriter component 230 can rewrite the data representation with a bound variable acquired externally. For example, if a data representation captures "bar(x)," "x" can correspond to the free variable parameter that can be bound. In one instance, the value of the variable may be associated with an outer sequence of a higher-order operator. Further, as the value of the parameter changes, a new data representation can be generated to reflect this change. Overall, not only is code that creates an inner sequence preserved as data, but parameters that are passed into that code are also preserved as data. Such a representation is significant at least because it can be saved as state in conjunction with checkpointing.

Further, that data representation and the parameter values can be stored separately prior to a rewrite that bounds a parameter in the data representation to a parameter. Separation of code from bound parameters values can help compact a checkpoint. For example, for operators like the "SelectMany" operator the same code for a result selector function can be invoked many times with different parameters. By storing code as data separate from the bound parameter values, code need only be stored once in addition to parameter bundles for each of multiple invocations. By way of example, values can be stored in a dictionary with reference to a particular data representation parameter.

Figure 3:
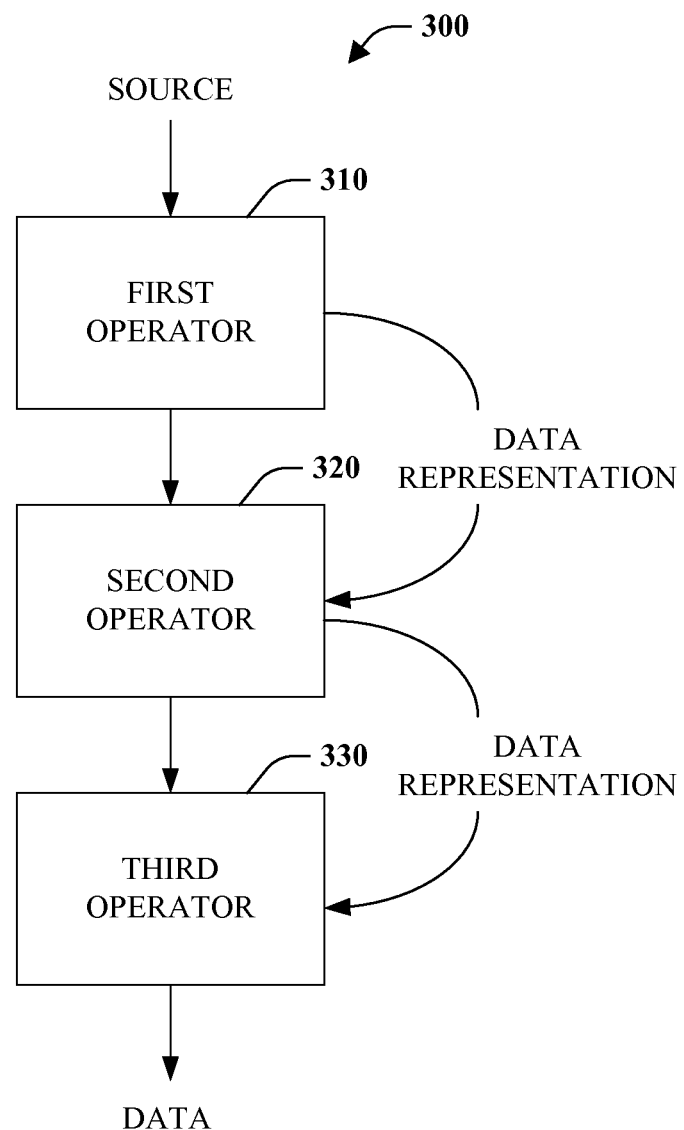
FIG. 3 is a block diagram of a data flow between query operators.

FIG. 3 illustrates a data flow 300 between operators. In particular, there are three operators, namely first operator 310, second operator 320, and third operator 330. The first operator 310 receives data from a source and executes some operation over the data. The second operator 320 receives data from the first operator 310 and performs an operation over the data. Similarly, the third operator 330 receives data from the second operator 320, performs some operation over the data, and outputs the data. Assume the first operator 310 creates an inner sequence and the third operator 330 utilizes the inner sequence. For example, the first operator 310 can be a "Select" operator that includes a payload that produces an inner sequence and the third operator 330 can be a "Switch" operator that employs the sequence. In addition to flowing data (or a reference thereto) representing the inner sequence from the first operator 310 through the second operator 320 to the third operator 330, a data representation of code that creates the sequence can be flowed through with the data. For example, a memory pointer to the inner sequence can be tagged with the data representation that species how to create the sequence and flowed through the operators. The data representation can include an expression that captures code as well as parameters to be passed to the expression to create the inner sequence. If this data representation is saved as part of a checkpointing process, after crash and recovery or reboot the inner sequence can be recreated using the data representation.

Figure 4:
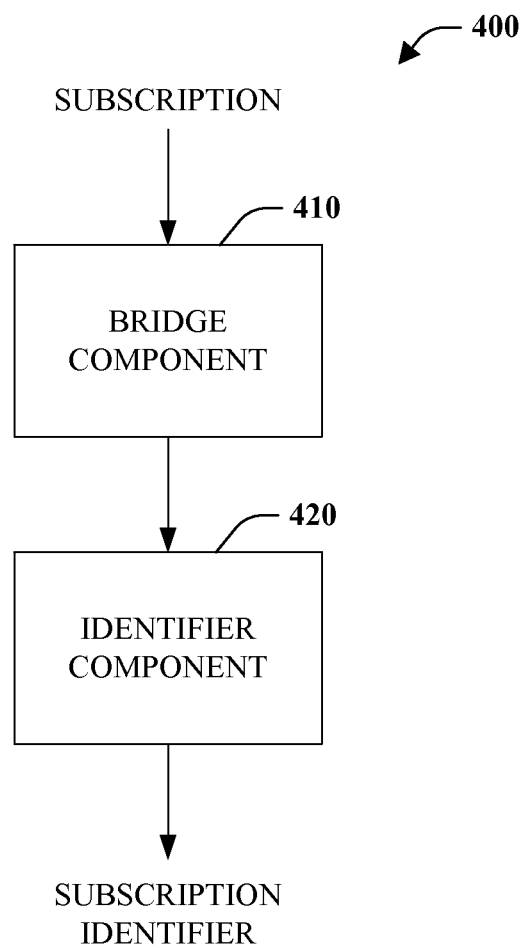
FIG. 4 is a block diagram of a decoupling system that decouples inner subscriptions from higher-order operators.

FIG. 4 is a decoupling system 400 that decouples inner subscriptions and outer subscriptions of a higher-order operator. The decoupling system 400 accepts as input a subscription provided by a higher-order operator. After receipt, the bridge component 410 is configured to construct a bridge or proxy between an inner subscription and outer subscription of a higher-order operator. The bridge component 410 can be configured to subscribe to the inner sequence in accordance with the provided subscription. Further, the bridge component 410 is configured to establish a subscription to the bridge by the higher-order operator. Stated differently, the bridge subscribes to the inner sequences in accordance with an inner subscription and receives elements from an inner sequence, and the higher-order operator subscribes to the bridge, which provides the elements received from the inner sequence. The identifier component 420 is configured to produce a unique identifier and return the identifier to the higher-order operator. The identifier identifies the bridge to which the higher-order operator subscribes to acquire data from the inner sequence indirectly. In one implementation, the higher-order operator itself may comprise functionality of the identifier component 420 to create an identifier prior to creating the bridge and holds this identifier rather than having it provided by the identifier component 420 at some later point.

Decoupling the inner subscription from an outer subscription of higher-order operator allows the inner subscription and the outer subscription to reside and execute in different execution contexts (e.g., different machines or processes). Moreover, the inner subscription and the outer subscription can fail and recover independently. Further, the higher-order operator can save the identifier as a part of its state during checkpointing thereby saving its relationship to an inner sequence. During recovery, the higher-order operator can reestablish its subscription to the inner sequence, and more particularly the bridge, with the identifier component.

Decoupling outer and inner subscriptions generally provides a mechanism to simplify checkpointing of higher-order operators by separating an operator into parts effectively flattening or reducing a hierarchy of outer and inner subscriptions to separate outer subscriptions and inner subscriptions. Bridges are one means to achieve such decoupling. However, there are other ways to achieve the same or similar effect. In one instance, a data representation for inner subscriptions can be added to the checkpoint state of a higher order operator. For example, a higher-order operator, such as "SelectMany," can be responsible for keeping track of the data representations for inner subscriptions including state associated with the inner subscriptions. Stated differently, the disclosed subject matter is not limited to the use of bridges to decouple inner subscriptions from outer subscriptions of a higher-order operator.

Figure 5:
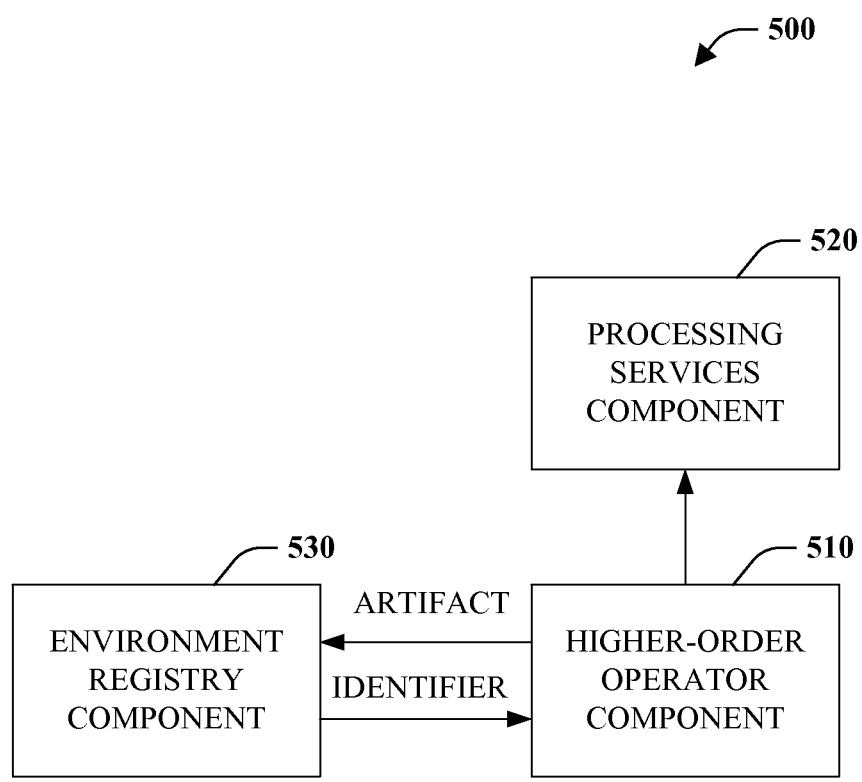
FIG. 5 is a block diagram of a data processing system.

FIG. 5 is a block diagram that illustrates data processing system 500. The data processing system 500 includes higher-order operator component 510, event processing services component 520, and environment registry component 530. The higher-order operator component 510 represents a higher-order operator as defined herein. The higher-order operator component 510 utilizing processing services component 520 to enable execution of a higher-order operator. The processing services component 520 is configured to provide services of a data processing system that supports execution or evaluation of operators over data in the system. The environment registry component 530 provides non-volatile storage associated with the data processing system and an environment of the data processing system, wherein the environment is global as opposed to being local to a particular machine or process. The higher-order operator component 510, or components or systems associated with the higher-order operation component 510, can add artifacts to the environment registry component 530. In response, the environment registry component 530 returns a unique identifier associated with the artifact. Alternatively, the high-order operator component 510 can create the unique identifier and request that the environment registry component 530 associated an artifact with the identifier. An artifact can correspond to any object or item that can be defined and saved in conjunction with checkpointing a higher-order operator. For instance, an artifact can correspond to an inner subscription, a bridge, a data representation of code, or a code parameter. Furthermore, the artifacts are subject to being persisted as part of a checkpoint. During recovery, the artifacts can be retrieved by identifier. By way of example, a stored bridge can be requested so that a higher-order operator can subscribe to the bridge and receive data from an inner sequence.

What follows is a more detailed description of the environment registry, capturing code, data, bridges, and use thereof. Moreover, the description is expressed in terms of one exemplary implementation in an event-processing context. It is to be appreciated that other implementations and contexts are possible, and the disclosed technology is not intended to be limited to the specific implementation and context disclosed.

The whole of an event processing system can be considered a service, such as a reactive service. An environment provides access to at least a subset of its services but from inside the system, while the services provide an external façade. Higher-order operators can use the environment to define new artifacts at runtime, such as subscriptions to inner sequences. These artifacts are identified by a unique identifier that can be persisted as operator state. Upon recovery, the operator can go back to the environment and re-obtain the artifact. Artifacts defined in the environment also get checkpointed.

To build this facility, operators need access to the environment in which they are operating. This can be done by means of a "subscription visitor" pattern on "ISubscription," which is an interface used to build operators in the event processing system. Through a call to "SetContext," operators can receive an "IOperatorContext" which exposes the environment:

```
void SetContext(IOperatorContext ctx);
interface IOperatorContext
{
    IReactiveEnvironment Environment { get; }
    IReactiveService ReactiveService { get; }
    ...
}
```

Upon receiving an event from a source subscription, an operator like "SelectMany" can call a selector function as part of an "OnNext" method:

```
void OnNext(T x) // observer of the source
{
    ISubscribable<T> ys = selector(x);
    ...
}
```

Once the operator has obtained an inner subscribable (e.g., ISubscribable type object), it can call a "Subscribe" on it, also performing any required initialization steps including calling "SetContext." However, this is something the environment can do on the operator's behalf.

Instead of calling "Subscribe" directly, the inner sequence can be subscribed to through a host's service:

```
interface IReactiveService
{
    ISubscription Subscribe<T>(string id,   ISubscribable<T> xs,
                                            IObserver<T> observer);
    ...
}
```

Essentially, the inner subscription is delegated to the service, along with an identifier. Note, however, that an execution environment could wrap the "ISubscribable<T>" that an operator, such as "SelectMany," receives in such a way that this plumbing, or, in other words, connective, code is hidden. The object that the "ISubscription" would acquire from creating a subscription on the wrapped or "intercepted" sequence would be able to be persisted because it would include an identifier selected on the operator's behalf. The identifier can be saved to a persistent store, or, in other words, persisted, by the operator, and used during recovery to re-establish the subscription to the operator's observer (which acts as a sink toward a downstream consumer):

```
interface IReactiveEnvironment
{
    ISubscription Subscribe<T>(string id, IObserver<T> observer);
    ...
}
```

Now the question becomes how the service can establish a subscription that can be persisted across service failure/recovery cycles using an in-memory object obtained from a call to some selector function or in the case of operators like "Switch" obtained from the input sequence. One answer is to use a data representation of code, such as an expression tree, that represents an artifact being created. By using an expression tree, the code representing the computation can be persisted by means of serialization. When recovering the system, these expressions can be de-serialized and the code re-evaluated.

In order to make a call to "Subscribe<T>" work, the "ISubscribable<T>" given to it should have an expression representation. However, without any special treatment, any such subscribable, or in other words observable, resource would have been compiled from its original expression tree. During this compilation act, the original expression tree is lost:

```
class Expression<T> : LambdaExpression
{
    T Compile( );
}
```

For example, given an "Expression<Func<int>>," the compiled form of the expression is a "Func<int>" delegate, which is an in-memory object that can execute code that was described in an original expression tree. However, no ties to the original expression tree remain:

```
Expression<Func<int>> e = ( ) => 42;
Func<int> f = e.Compile( );
```

In the above sample, "f" no longer has a reference to "e." In fact, the expression tree referred to by "e" can be garbage collected provided no one else holds a reference to the expression tree "e."

In the context of a higher-order operator, consider the following expression:

```
Expression<Func<ISubscription>> e = ( ) => xs.SelectMany(x => bar(x))
                                            .Subscribe(foo);
```

When a query engine receives this expression, it will compile it in order to evaluate the subscription. The resulting "ISubscription" is then used as a handle (e.g., identifier, pointer . . . ) to the computation, and fed with context during initialization. Finally, the subscription is started. However, at some point during the subscription's execution lifetime, "xs" may produce a message that is observed by the "Select-Many" operator causing it to evaluate "bar(x)" and subscribe to it by giving "bar(x)" to a "Subscribe<T>" method, for example. At that point, the service needs to be able to obtain an expression tree describing "bar(x)" with a concrete value for "x" in order to store it in a service environment, or more particularly a registry, populated with expressions that are persisted during checkpointing. In its original received form, this artifact comprises an expression tree. Nodes of a certain type in the expression tree can be rewritten to wrappers with a reference to the original expression tree in process that can be referred to as "quotation preservation" or, more briefly "quotation." To illustrate this in a simpler context consider the following code snippet:
Expression<Func<Bar>> e=( )=>new Bar(42).Foo( );
Assume "Bar" is a class whose "Foo" method returns another instance of "Bar." However, during the execution of "Foo," the method may need to access an expression representation of its argument. That is, the expression representing "new Bar(42)." If the expression is compiled and invoked, "Foo" will only see the concrete Bar instance that was obtained by evaluating "new Bar(42)." However, its expression representation will not be around.

```
class Bar
{
    public Bar Foo( )
    {
        var e = this as IExpressible;
        if (e != null)
        {
            DoSomethingWith(e.Expression);
        }
    }
}
```

In fact, from a quick inspection of the code above, one may conclude that "Bar" did not implement "IExpressible," so the "as" expression in "Foo" would simply return a null value. However, "Bar" is not a sealed class, so a derived type may implement this interface, making the "as" type-check/conversion in "Foo" work. This property can be exploited for quotation preservation. Notice that alternative means, instead of derivation of types, are also possible. For example, an expression tree could be transformed to associate each intermediate allocated object with its expression representation through some dictionary.

To illustrate this, the expression tree shown before can be rewritten as follows:

```
Expression bar1 = Expression.New(typeof(Bar), Expression.Constant(42));
Expression bar2 = Expression.Call(bar1, "Foo");
Expression<Func<Bar>> e = Expression.Lambda<Func<Bar>>(bar2);
```

This is essentially what the compiler generates. Notice that both "bar1" and "bar2" have "Bar" as the type of the expression (i.e. what is returned from the "Expression.Type" property). A specialized component in the query engine, referred to as a quotation visitor, now looks for each node of a special type, here "Bar," and rewrites it by putting a quoted wrapper around it. Such a quoted wrapper is a type derived from the original type, adding "IExpressible" to it:

```
class QBar : Bar, IExpressible
{
    private readonly Bar bar;
    public QBar(Bar b, Expression e)
    {
        Expression = e;
        bar = b;
    }
    public Expression Expression { get; private set; }
    // All operations on Bar, forwarding to this.bar.
}
```

The rewriter is parameterized by the original type ("Bar") and the target type ("QBar") and assumes it can instantiate the quoted type "QBar" by passing a "Bar" instance to it along with its expression representation. For the ongoing example:

```
Expression b1 = Expression.New(typeof(Bar), Expression.Constant(42));
Expression q1 = Expression.New(typeof(QBar), b1,
Expression.Constant(b1));
Expression b2 = Expression.Call(q1, "Foo");
Expression q2 = Expression.New(typeof(QBar), b2,
Expression.Constant(b2));
Expression<Func<Bar>> e = Expression.Lambda<Func<Bar>>(q2);
```

The expression tree still passes type checking since "QBar" derives from "Bar." Each node of type "Bar" now is wrapped by an expression to create a "QBar" instance that refers to the expression itself, hence producing an instance of "Bar" for the first constructor parameter, as well as a constant expression that contains the expression representing the current node.

Returning to the context of higher-order operator support for "ISubscribable<T>," this technique can be applied for nodes of type "ISubscribable<T>" rewriting these to "QuotedSubscribable<T>" instances, which implement "IExpressible." Consider the following example query:

```
Expression<Func<ISubscription>> e = ( ) => xs.SelectMany(x => bar(x))
                                          .Subscribe(foo);
```

Here, three quotes are introduced: (1) a quote around "xs"; (2) a quote around "xs.SelectMany(x=>bar(x))"; and (2) a quote around "bar(x)." The third quote is what the "SelectMany" operator needs at runtime. When the selector function is executed, the quoted representation "bar(x)" is used by the higher-order operator to obtain the expression tree that can be persisted for the subscription.

Notice one complexity though. The expression "bar(x)" contains a free variable "x." To get around this, the quotation visitor supports capturing the environment of an expression, that is, bindings for each free variable that occurs in it. In particular, the constructor a quoted representation of a type can also contain a dictionary that maps free variables (e.g., of type ParameterExpression) onto their values. Consider the expression representation of "bar(x)":

```
// ingredients for x => bar(x)
var x   = Expression.Parameter (typeof(int), "x");
var bar = Expression.Parameter(typeof(Func<int, ISubscribable<int>>),
"bar");
```

```
var barx  = Expression.Invoke(bar, x);
// lambda x => bar(x) passed to SelectMany
var slct  = Expression.Lambda<Func<int, ISubscribable<int>>>(barx, x);
```

The rewriter wraps "barx" as follows:

```
var qarx = Expression.New(
    typeof(QuotedSubscribable<int>),
    barx, // the ISubscribable<int>
    Expression.Constant(barx), // the expression representation
    Expression.ListInit( // the environment "x" | - > x
        Expression.New(typeof(Environment)),
        Epxression.ElementInit("Add", Expression.Constant(x), x)
    )
);
```

The "QuotedSubscribable<T>" type has the following definition:

```
class QuotedSubscribable<T> : ISubscribable<T>, IExpressible
{
    private readonly ISubscribable<T> subscribable;
    private readonly Expression expression;
    private readonly Environment env;
    public QuotedSubscribable(ISubscribable<T> s, Expression e,
Environment z)
    {
        subscribable = s;
        expression = e;
        env = z;
    }
    public Expression Expression
    {
        get { /* substitute free variables in expression by using env */ }
    }
    // All operations on ISubscribable<T>, forwarding to
    this.subscribable.
}
```

In here, the "Environment" is an alias for a read-only "Dictionary<ParameterExpression, object>." Upon compiling and executing the "ListInit" expression, the "Environment" is populated with the actual values of the parameters. The expression stored in the quoted representation can then be rewritten by substituting the free variables in the environment for their actual values. All of this happens lazily when the Expression property's getter is invoked. The call to the getter happens when the environment establishes a subscription to the quoted subscription.

This technique effectively turns every ISubscribable<T> that occurs in an expression tree into its self-quoted form. This enables all higher operators to work without having to do anything in this regard themselves. Rather, the host environment retains the quotes that are needed eventually when higher-order subscriptions are made. A whole realm of optimizations on selective quoting is possible by performing data flow analysis and determining that a subscribable instance will never be used in the context of a higher-order operation that requires its expression representation.

Figure 6:
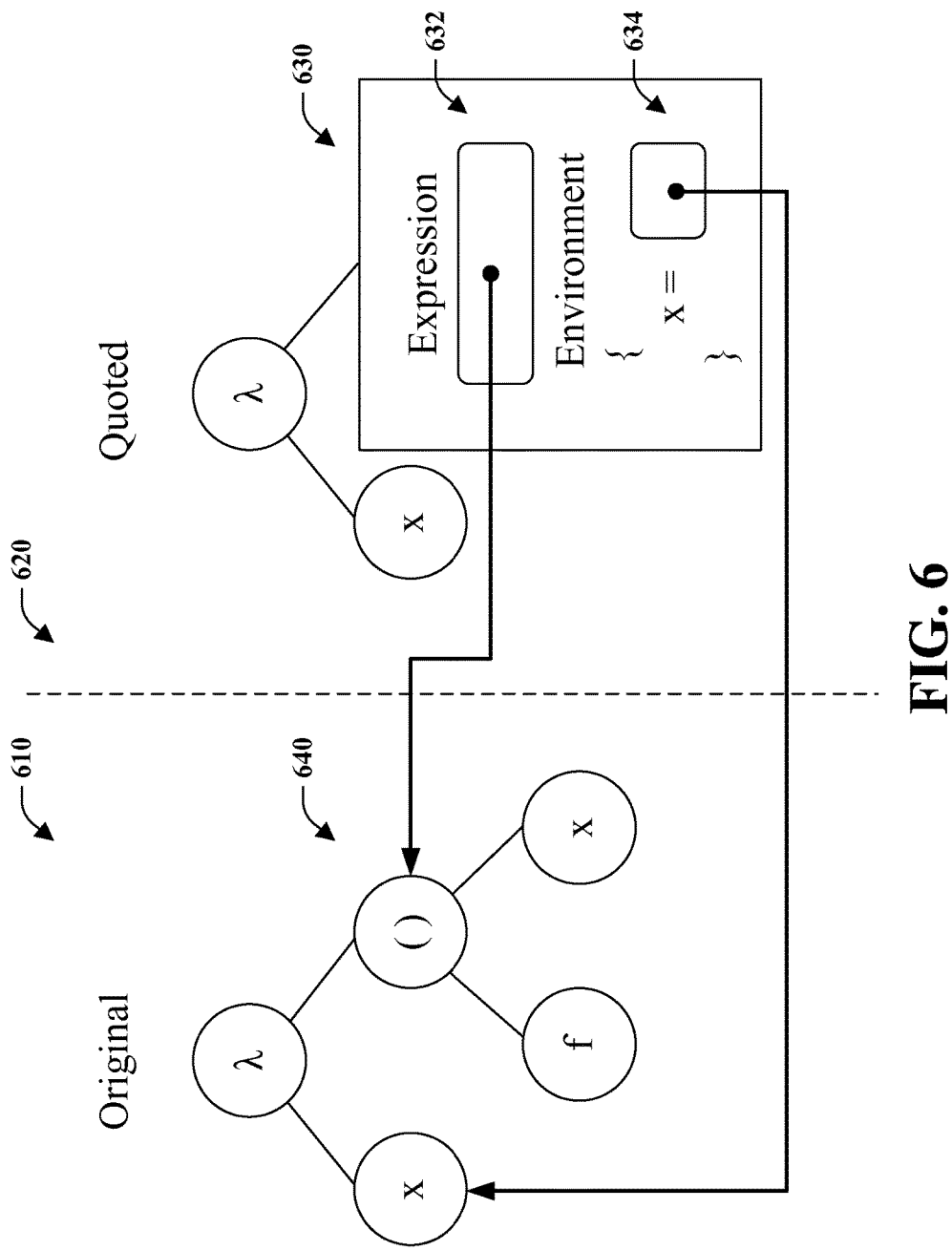
FIG. 6 is a diagram of a mechanism of providing quotation of subexpressions representing sequences for use by higher-order operators.

FIG. 6 illustrates a mechanism of providing quotation of subexpressions representing sequences for use by higher-order operators. Original expression tree 610 corresponds to code associated with a query or portion thereof represented as data and more particularly as an expression tree. Quoted expression tree 620 includes a quotation of a subexpression in the original expression tree 610. In particular, quotation 630 provides an expression representation for the subtree 640 including node "f," "( )" and "x." In particular, the expression 632 captures code represented by the subtree 640 as data, namely "f(x)." Additionally, the parameter "x" is identified. Here, "x" is a free variable that can be bound to an external value of "x" 634 at the time the quotation is captured. In other words, the parameter is mapped to a particular value. The quotation can correspond to an inner subscription or sequence. As such, the value of "x" can correspond to a value based on an outer subscription or sequence of a higher-order operator.

A bridge is one exemplary mechanism to decouple the higher-order operator outer subscription, and more specifically an observer receiver, from an inner subscription and its observable definition. More generally, a bridge can provide a means to flatten a hierarchy of outer and inner subscriptions into separate outer subscriptions and inner subscriptions. In accordance with implementation, a bridge can include three pieces. First, a bridge comprises a subject of element type "T," where "T" is the type of elements in the inner subscription. A subject is a programmatic construct that is both an observer and an observable such that the subject can subscribe to a data source and observers can subscribe to the subject to receive data from the source. Additionally, a bridge comprises an upstream observable definition, based on the expression extracted from a quote, and an upstream subscription connecting the subject to the observable instantiation.

Figure 7:
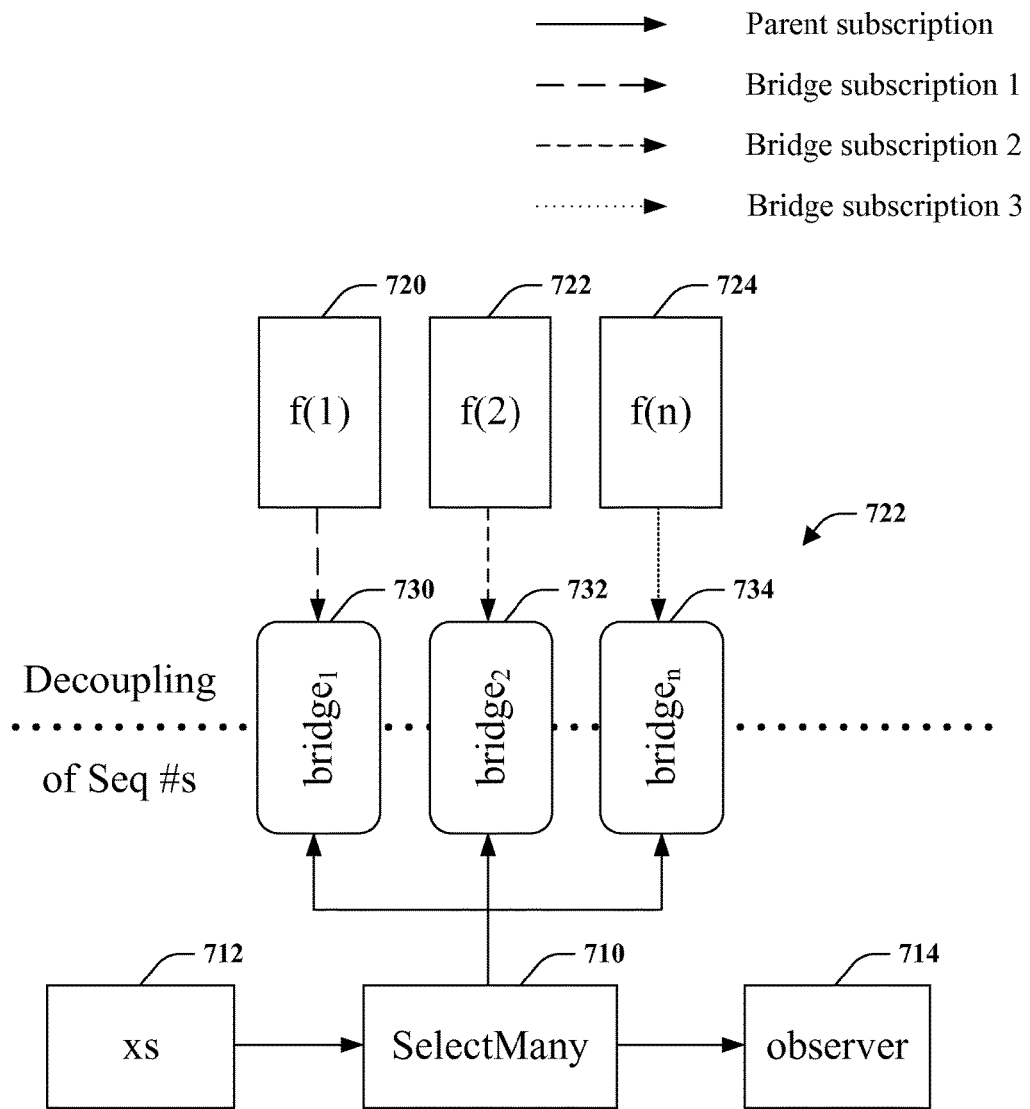
FIG. 7 is a block diagram of bridges decoupling a higher-order operator from the multiple inner sequences.

FIG. 7 illustrates bridges decoupling a higher-order operator from the multiple inner sequences. The "SelectMany" operator 710 is a higher-order operator that receives an outer sequence of "xs" 412 performs a select many operation and returns results to an observer 714. However, such an operation involves producing a sequence of sequences. In particular, the "SelectMany" operator 710 can subscribe to several inner sequences in addition to an outer sequence. Here, three inner stream subscriptions are depicted, namely inner subscription f(1) 720, inner subscription f(2) 722, an inner subscription f(n) 724. As a concrete example, consider a stock ticker that receives stock ticks for company one, company two, and company three. The outer sequence of "xs" can correspond to company names, and the inner subscriptions can capture stock prices for specific companies. However, the "SelectMany" operator 710 is not connected directly to the inner subscriptions but rather indirectly by way of bridges. Each inner subscription is attached to a separate and corresponding bridge. In particular, a bridge$_1$ 730 is connected to the inner subscription f(1) 720, bridge$_2$ 732 is connected to inner subscription f(2) 722, and bridge$_n$ is connected to inner subscription f(n) 724. The bridges subscribe to inner sequences and the "SelectMany" operator 710 subscribes to the bridges. Thus, the bridges decouple the higher-order operator from the inner subscriptions. Stated differently, the lifetimes of subscriptions upstream and downstream are decoupled. Consequently, inner subscriptions and higher-order operators can operate on different machines or processes, and fail and recover independently.

Upon recovery, all bridges can be recovered first. Next, when a higher-order operator is recovered, it can re-establish its subscription to the bridge. Each bridge has exactly one downstream subscription, which connects the bridge to an inner sequence of a higher-order operator. Eventually, when an upstream subscription to a bridge is recovered, data flow to the original observable is restored. Because bridges are recovered prior to subscriptions, the order of recovery of subscriptions involving higher-order operators and upstream stream subscriptions to bridges does not matter. Absent the bridges, all artifacts would have to be sorted in a topological order for recovery to work. Accordingly, recovery time is reduced by the bridges.

Putting pieces together, a base class for higher order operators can be constructed, exposing facilities to create e.g. inner subscriptions (or inner streams), load and save these, etc. An excerpt of such an exemplary class is shown below:

```
public abstract class HigherOrderStatefulOperator<TParam, TResult> : ...
{
    protected HigherOrderStatefulOperator(TParam args,
        IObserver<TResult> obs);
    public override void SetContext(IOperatorContext context);
    protected ISubscription
    SubscribeInner<TInner>(ISubscribable<TInner> inner,
            IObserver<TInner> observer);
    protected ISubscription LoadInner<TInner>(IOperatorStateReader reader,
            IObserver<TInner> observer);
    protected void SaveInner(ISubscription innerSubscription,
            IOperatorStateWriter writer);
    ...
}
```

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, such mechanisms can be employed to infer portions of code used in the context of a higher-order operation in conjunction with capturing a data representation thereof.

In view of the exemplary systems described above, methodologies that may be implemented in accordance with the disclosed subject matter will be better appreciated with reference to the flow charts of FIGS. 8-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 8:
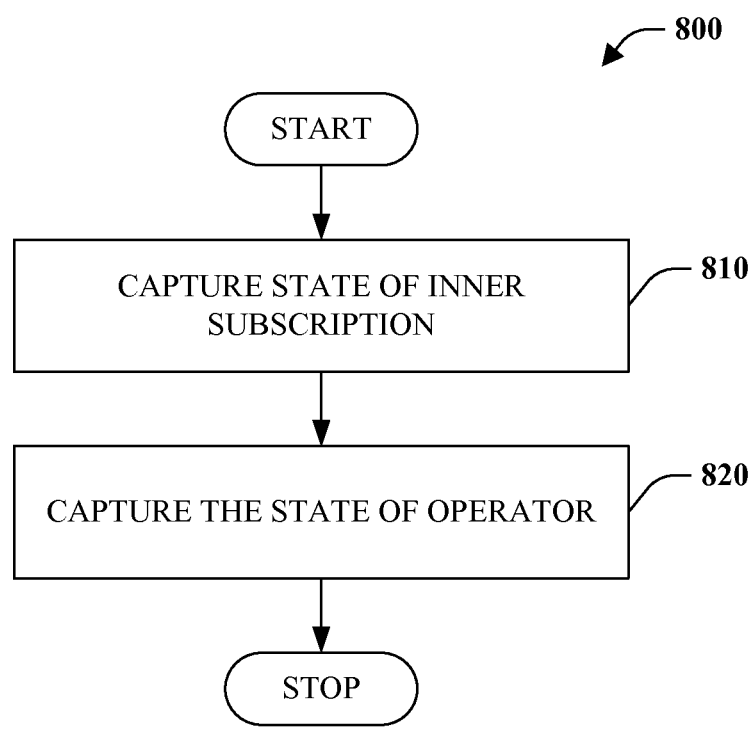
FIG. 8 is a flow chart diagram of a method of checkpointing higher-order query operator.

Referring to FIG. 8, a method of checkpointing higher-order query operator 800 is illustrated. At reference numeral 810, the state of an inner subscription of the higher-order operator is captured. In accordance with one aspect, this can involve acquiring a data representation of an inner subscription. More specifically, the data representation can be configured to describe code utilized to generate the subscription that acquires a particular sequence. Further, state of the subscription can be acquired. Although not limited thereto, according to one implementation, the data representation and state can be stored in a registry in data processing system environment mapped to unique identifier. At numeral 820, the state of the higher-order operator is captured. This can include this can include processing state with respect an outer subscription that processes of an outer sequence and one or more subscriptions. Additionally, one or more identifiers that specify a relationship or dependency with respect to an inner subscription can be saved.

Figure 9:
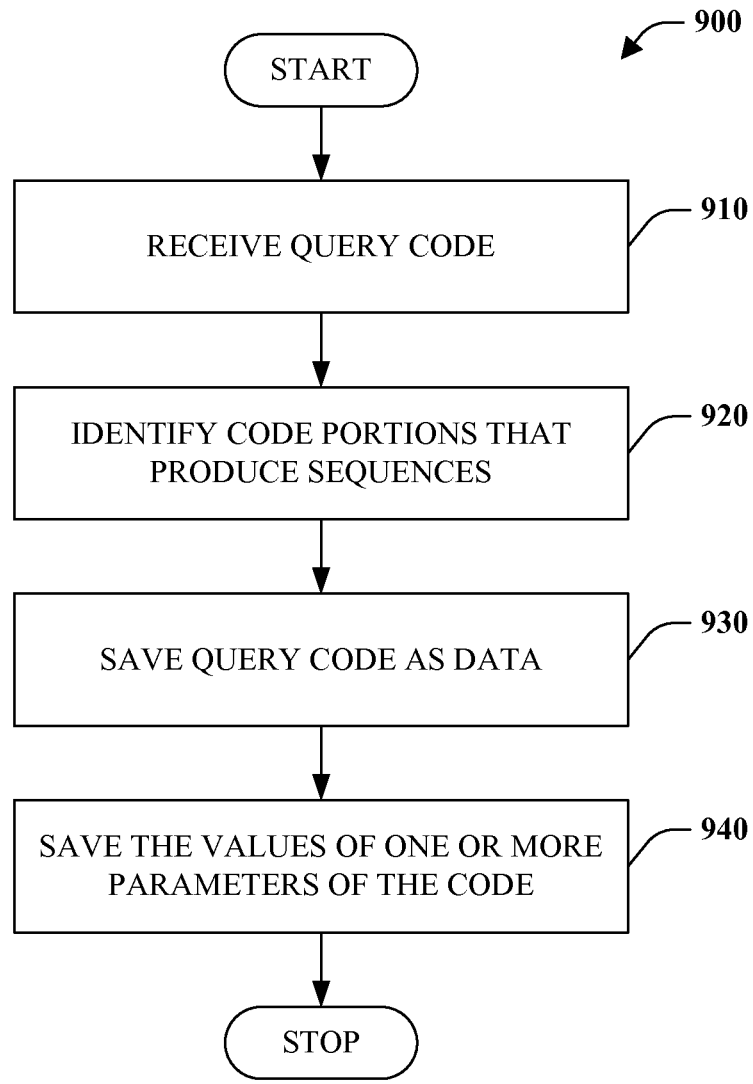
FIG. 9 is a flow chart diagram of a method capturing state associated with an inner subscription.

FIG. 9 depicts a method 900 of capturing state associated with an inner subscription. At reference numeral 910, a query code is received, retrieved, or otherwise obtained or acquired. At numeral 920, portions of code are identified that produce sequences. In accordance with one aspect, portions of code that produce sequences can be identified statically prior to runtime. In accordance with another aspect, solely portions of code that are used in the context of a higher-order operation are identified. In other words, portions of code where higher-order sequences are introduced can be identified. At reference numeral, 930, the query code is saved as data in a data representation such as, but not limited, to an expression tree. The data representation describes how to create a subscription in terms of code. At numeral 940, values of one or more parameters of the described code are saved. The values of the parameters are associated with a state of a subscription and can change and be captured at runtime.

Figure 10:
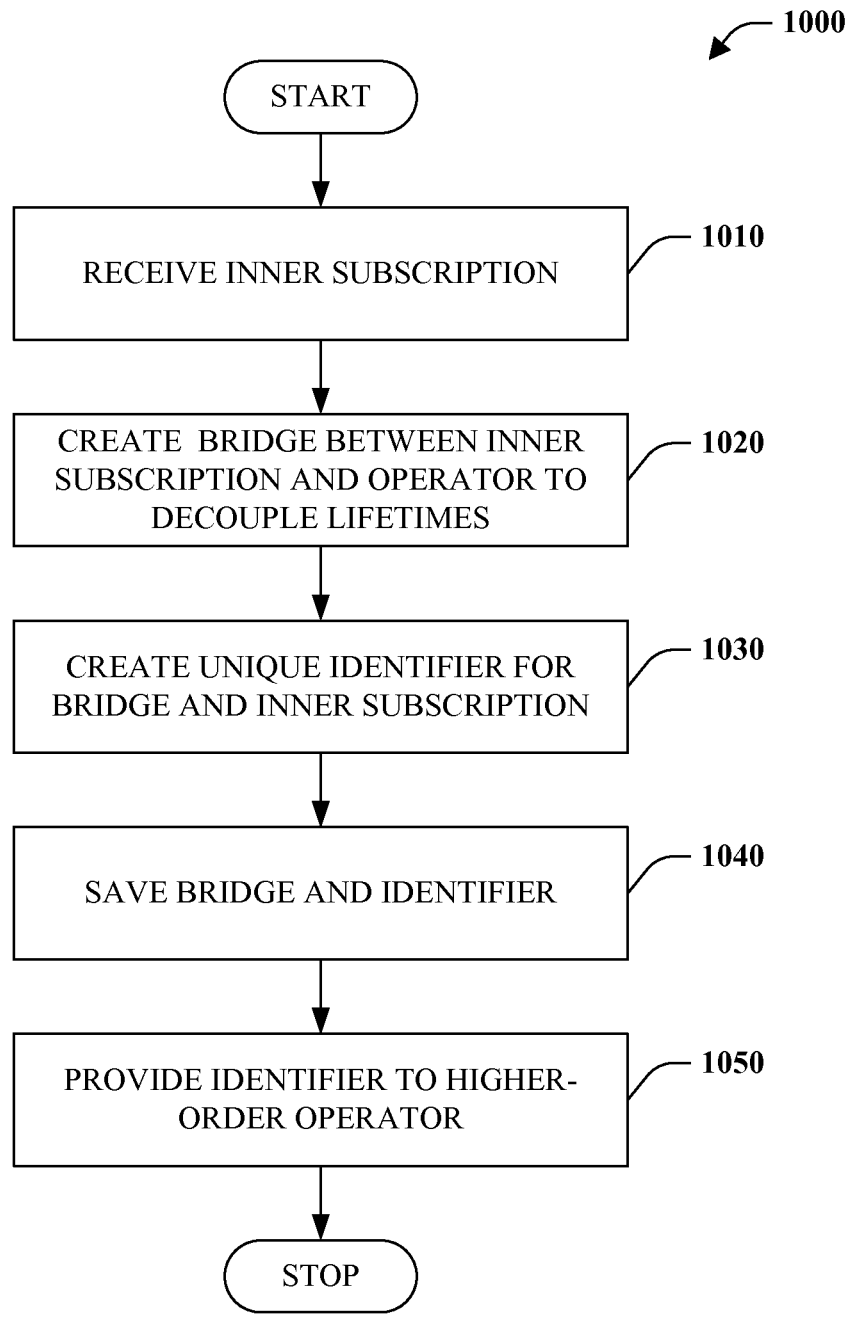
FIG. 10 is a flow chart diagram of a method of decoupling a higher-order operator from an inner subscription.

FIG. 10 is a flow chart diagram of a method 1000 of decoupling a higher-order operator from an inner subscription. At reference numeral 1010, an inner subscription is received, retrieved or otherwise obtained or acquired. The inner subscription corresponds to a higher-order operator inner subscription. At reference 1020, a bridge is created between the inner subscription and an associated higher-order operator. More specifically, the bridge can subscribe to an inner sequence produced by the inner subscription and the associated higher-order operator can subscribe to the bridge with will provide elements from the inner sequence to the higher-order operator. As a result, the inner subscription is decoupled from a higher-order operator, or more particularly the observer of the higher-order operator. In other words, the bridge decouples the upstream portion of a higher-order subscription from its downstream consumption, which is the the side of the higher-order operator connecting the inner subscription's output to its own observer. At numeral 1030, a unique identifier is associated with the bridge. At reference 1040, the bridge and the identifier are saved. In accordance with one embodiment, the bridge and identifier mapping can be saved in a registry that is part of an event processing system environment. Furthermore, registry and it constituent elements are subject to checkpointing. At reference numeral 1050, the identifier is provided to the higher-order operator. The identifier represents a relationship or dependency on an inner subscription here indirectly through the bridge. This identifier can be saved as part of the high-order operator state corresponding to topology state as opposed to computation state.

Figure 11:
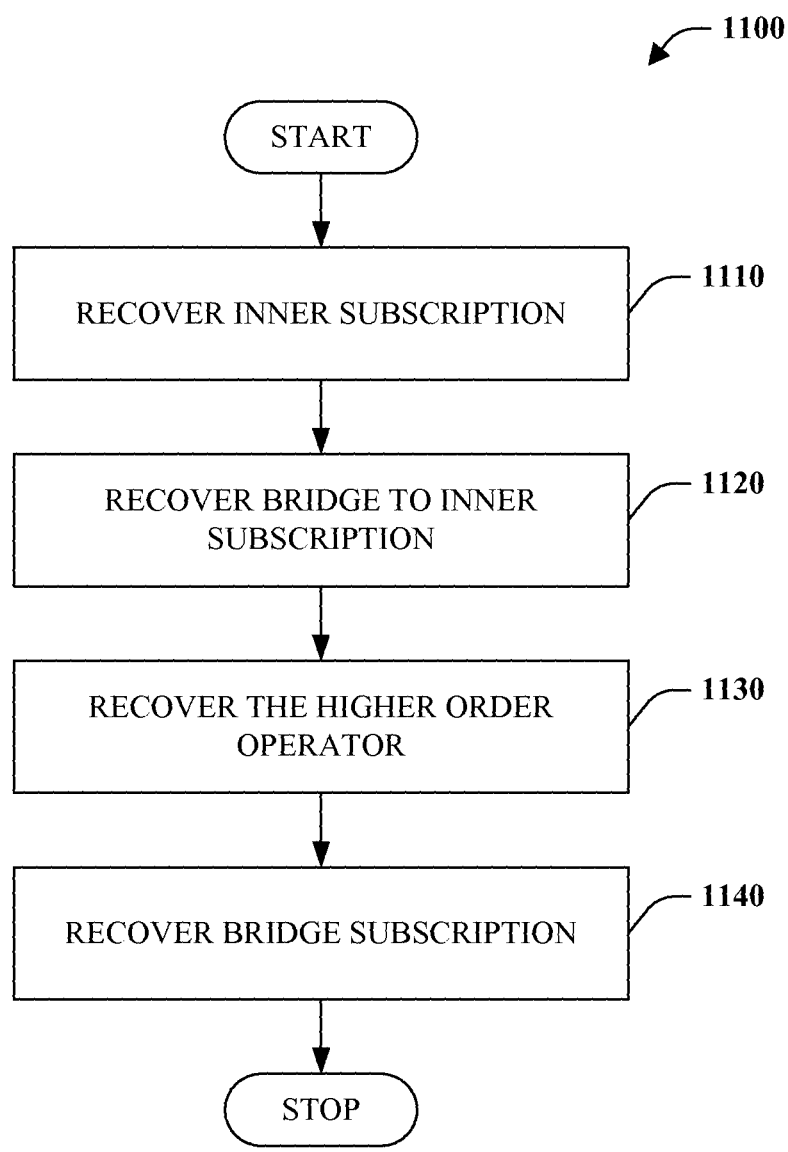
FIG. 11 is a flow chart diagram of a method of recovery associated with a higher-order operator.

FIG. 11 depicts a method of higher-order operator recovery. At reference numeral 1110, an inner subscription is recovered. The inner subscription can be recovered from a quotation or data representation that describes code that creates the inner subscription or sequence and associated computation state. At numeral 1120, a bridge between an inner subscription and higher-order operator is recovered. At reference 1130, the higher-operator is recovered from persisted state capturing the operator. At reference numeral 1140, the bridge subscription is recovered. The bridge subscription can be recovered based on topology state recovered with the higher order operator that specifies an identifier that maps to a bridge to which the higher-order operator subscribes.

In many cases herein, the specification discloses employment of checkpointing in conjunction with failure and recovery. However, checkpointing concerns state persistence, which can more generally be utilized when execution is stopped and resumed for a variety of reasons. Of course, one scenario that involves stopping and resuming execution is when there is a failure and subsequent recovery. Other reasons execution could be stopped and restarted include system migration and software updates or upgrades, among other things. Consequently, checkpointing of higher-order operators is not intended to be limited to failure and recovery scenarios but rather any situation where execution is stopped and restarted.

The subject disclosure supports various products and processes that perform, or are configured to perform, various actions regarding efficient data manipulation support. What follows are one or more exemplary systems and methods.

A system comprises a processor coupled to a memory, the processor configured to execute the following computer-executable components stored in the memory: a first component configured to capture state of an outer subscription of a higher-order operator that functions with respect to sequence of sequences; and a second component configured to capture state of an inner subscription of the higher-order operator. The first component is further configured to save an identifier that identifies a relationship to the inner subscription and a bridge between the inner subscription and the outer subscription of the higher-order operator. The second component is further configured to save a data representation of the inner subscription that describes how to produce code that creates the inner subscription and a parameter value of the code. The second component is further configured to save the state of the inner subscription to a registry within an event processing system environment.

A method comprises employing at least one processor configured to execute computer-executable instructions stored in a memory to perform the following acts: identifying a higher-order operator that functions with respect to a sequence of sequences for checkpointing; capturing state of an outer subscription of the operator; and capturing state of an inner subscription of the operator. Capturing the state of the inner subscription further comprises saving a data description of how to produce executable code that creates the inner subscription and saving a value of a parameter of the executable code. The method further comprises saving an identifier of the inner subscription in conjunction with the state of the outer subscription and saving an identifier to a bridge between the inner subscription and the operator. The method further comprises recovering the inner subscription from the state of the inner subscription and recovering the inner subscription from a data representation of code that creates the inner subscription and a parameter value. The method further comprises recovering the outer subscription from the state of the subscription, recovering a bridge to the inner subscription, and recovering a subscription to the bridge.

A computer-readable storage medium having instructions stored thereon that enable at least one processor to perform a method upon execution of the instructions, the method comprising: identifying a higher-order operator that functions with respect to a sequence of sequences during a checkpoint operation; capturing state of an outer subscription of the operator; and capturing state of an inner subscription of the operator by saving a data description of code that creates the inner subscription and a value of a parameter of the code. The method further comprises saving an identifier to a bridge between the inner subscription and the outer subscription of the operator, wherein the bridge decouples the outer subscription from the inner subscription. The method further comprises recovering the bridge to the inner subscription and recovering to a subscription to the bridge based on the identifier. The method further comprises recovering the inner subscription from the data description of code that creates the inner subscription and the value of the parameter.

Aspects of the subject disclosure pertain to the technical problem of resuming execution after execution was stopped, for example associated with failure, upgrade, or migration to a new machine. The technical features associated with addressing this problem involve capturing state associated with a higher-order operator and subsequently utilizing the state to recover from a failure. Further technical features concern generation of data able to be saved as state including inner subscriptions of a higher-order operator. Further, use of bridges is disclosed to enable higher-order operators and related inner subscriptions to operator on different machines or processes. Accordingly, aspects of the disclosure exhibit technical effects with respect to producing reliable and efficient data processing.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'"' is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 12:
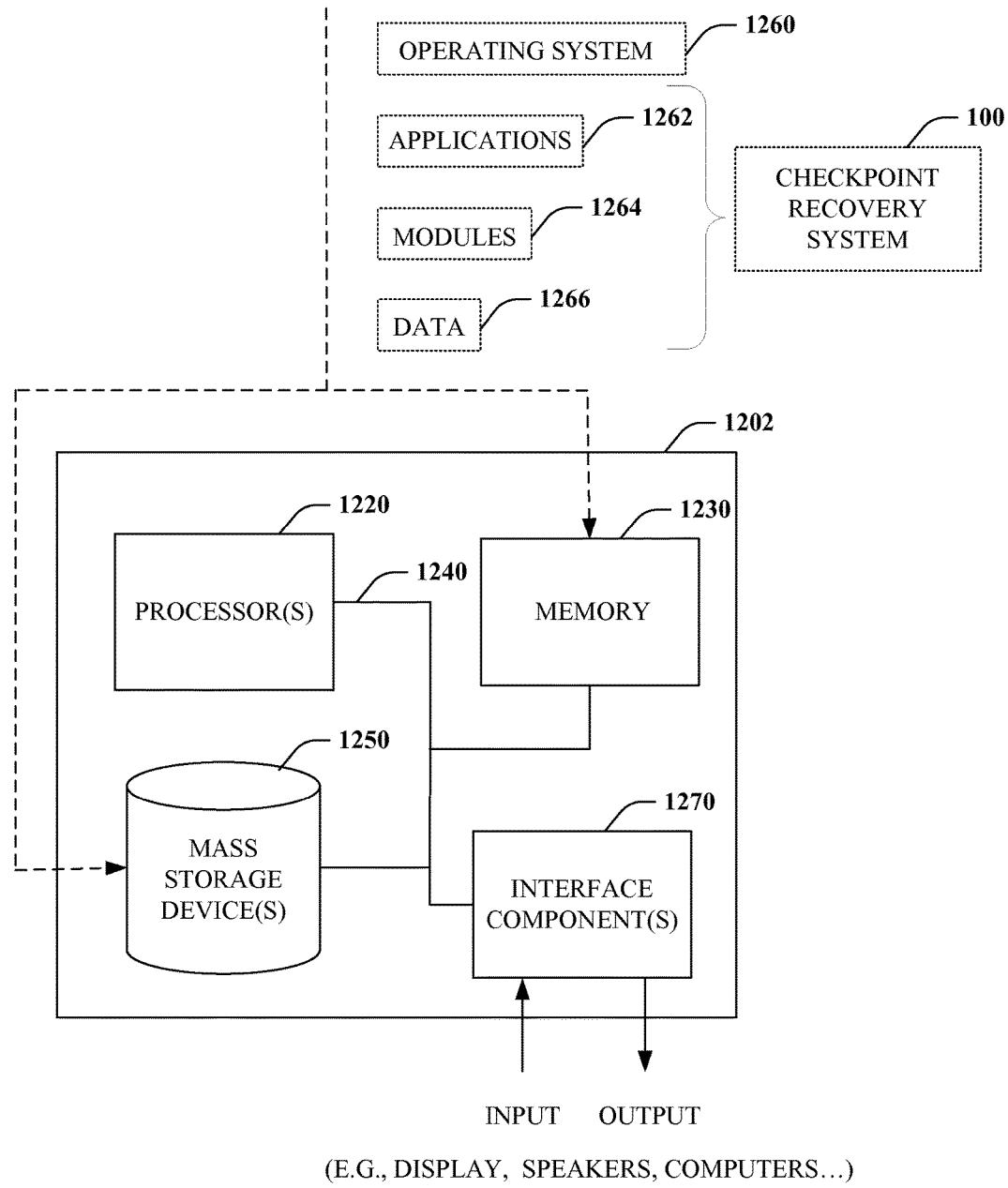
FIG. 12 is a schematic block diagram illustrating a suitable operating environment for aspects of the subject disclosure.

In order to provide a context for the claimed subject matter, FIG. 12 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 12, illustrated is an example general-purpose computer or computing device 1202 (e.g., desktop, laptop, tablet, watch, server, hand-held, programmable consumer or industrial electronics, set-top box, game system, compute node . . . ). The computer 1202 includes one or more processor(s) 1220, memory 1230, system bus 1240, mass storage device(s) 1250, and one or more interface components 1270. The system bus 1240 communicatively couples at least the above system constituents. However, it is to be appreciated that in its simplest form the computer 1202 can include one or more processors 1220 coupled to memory 1230 that execute various computer executable actions, instructions, and or components stored in memory 1230.

The processor(s) 1220 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1220 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 1202 can include or otherwise interact with a variety of computer-readable media to facilitate control of the computer 1202 to implement one or more aspects of the claimed subject matter. The computer-readable media can be any available media that can be accessed by the computer 1202 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1202. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1230 and mass storage device(s) 1250 are examples of computer-readable storage media. Depending on the exact configuration and type of computing device, memory 1230 may be volatile (e.g., RAM), non-volatile (e.g., ROM, flash memory . . . ) or some combination of the two. By way of example, the basic input/output system (BIOS), including basic routines to transfer information between elements within the computer 1202, such as during start-up, can be stored in nonvolatile memory, while volatile memory can act as external cache memory to facilitate processing by the processor(s) 1220, among other things.

Mass storage device(s) 1250 includes removable/non-removable, volatile/non-volatile computer storage media for storage of large amounts of data relative to the memory 1230. For example, mass storage device(s) 1250 includes, but is not limited to, one or more devices such as a magnetic or optical disk drive, floppy disk drive, flash memory, solid-state drive, or memory stick.

Memory 1230 and mass storage device(s) 1250 can include, or have stored therein, operating system 1260, one or more applications 1262, one or more program modules 1264, and data 1266. The operating system 1260 acts to control and allocate resources of the computer 1202. Applications 1262 include one or both of system and application software and can exploit management of resources by the operating system 1260 through program modules 1264 and data 1266 stored in memory 1230 and/or mass storage device(s) 1250 to perform one or more actions. Accordingly, applications 1262 can turn a general-purpose computer 1202 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, checkpoint recovery system 100, portions thereof, or supporting systems can be, or form part, of an application 1262, and include one or more modules 1264 and data 1266 stored in memory and/or mass storage device(s) 1250 whose functionality can be realized when executed by one or more processor(s) 1220.

In accordance with one particular embodiment, the processor(s) 1220 can correspond to a system on a chip (SOC) or like architecture including, or in other words integrating, both hardware and software on a single integrated circuit substrate. Here, the processor(s) 1220 can include one or more processors as well as memory at least similar to processor(s) 1220 and memory 1230, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the checkpoint recovery system 100 and/or associated functionality can be embedded within hardware in a SOC architecture.

The computer 1202 also includes one or more interface components 1270 that are communicatively coupled to the system bus 1240 and facilitate interaction with the computer 1202. By way of example, the interface component 1270 can be a port (e.g., serial, parallel, PCMCIA, USB, FireWire . . . ) or an interface card (e.g., sound, video . . . ) or the like. In one example implementation, the interface component 1270 can be embodied as a user input/output interface to enable a user to enter commands and information into the computer 1202, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1270 can be embodied as an output peripheral interface to supply output to displays (e.g., LCD, LED, plasma . . . ), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A checkpoint system comprising:
a processor coupled to a memory, the processor configured to execute machine-executable instructions stored in the memory that when executed perform acts comprising:
identifying a higher-order query operator, that produces or consumes an outer sequence comprising one or more inner sequences in conjunction with performing a query operation corresponding to the query operator, after initiation of a checkpoint operation;
capturing state of an outer subscription, to an outer sequence of data, of the higher-order query operator;
capturing state of an inner subscription, to an inner sequence of data, of the higher-order query operator; and
saving the captured state of the outer subscription and inner subscription to a non-volatile storage medium, wherein the state of the outer subscription and inner subscription are decoupled, and an identifier of the inner subscription is saved as part of the state of the outer subscription.

2. The system of claim 1, the acts further comprise saving an identifier that identifies a bridge between the inner subscription and the outer subscription of the higher-order operator.

3. The system of claim 1, the acts further comprising saving a data representation of the inner subscription that describes how to produce code that creates the inner subscription.

4. The system of claim 3, the acts further comprise saving a parameter value of the code.

5. The system of claim 1, the acts further comprise saving the state of the inner subscription to a non-volatile store within an event processing system environment subject to checkpointing.

6. A method of checkpointing a higher-order query operator comprising:
employing at least one processor configured to execute computer-executable instructions stored in a memory to perform the following acts:
identifying a higher-order query operator, that produces or consumes an outer sequence comprising one or more inner sequences in conjunction with performing a query operation corresponding to the query operator;
capturing state of an outer subscription of the higher-order query operator including an identifier of an inner subscription; and
capturing state of the inner subscription of the of the higher-order query operator decoupled from the state of the outer subscription.

7. The method of claim 6, capturing the state of the inner subscription comprises saving a data description of how to produce executable code that creates the inner subscription.

8. The method of claim 7 further comprises saving a value of a parameter of the executable code.

9. The method of claim 6 further comprises saving an identifier to a bridge between the inner subscription and the operator.

10. The method of claim 6 further comprises recovering the inner subscription from the state of the inner subscription.

11. The method of claim 10 further comprises recovering the inner subscription from a data representation of code that creates the inner subscription and a parameter value.

12. The method of claim 6 further comprises recovering the outer subscription from the state of the subscription.

13. The method of claim 12 further comprises recovering a bridge to the inner subscription.

14. The method of claim 13 further comprises recovering a subscription to the bridge.

15. A computer-readable storage medium having instructions stored thereon that enable at least one processor to perform a method upon execution of the instructions, the method comprising:
- identifying a higher-order query operator, that produces or consumes an outer sequence comprising one or more inner sequences in conjunction with performing a query operation corresponding to the query operator, during a checkpoint process;
- capturing state of an outer subscription of the higher-order query operator including identification of at least one dependent inner subscription, wherein the state of the outer subscription and state of the dependent inner subscription are decoupled; and
- capturing state of the inner subscription of the higher-order query operator by saving a data description of code that creates the inner subscription and a value of a parameter of the code.

16. The computer-readable storage medium of claim 15, the method further comprises saving an identifier to a bridge between the inner subscription and the outer subscription of the operator, wherein the bridge decouples the outer subscription from the inner subscription.

17. The computer-readable storage medium of claim 16, the method further comprises recovering the bridge to the inner subscription and recovering to a subscription to the bridge based on the identifier.

18. The computer-readable storage medium of claim 15, the method further comprises recovering the inner subscription from the data description of code that creates the inner subscription and the value of the parameter.

* * * * *